(12) United States Patent
Carberry et al.

(10) Patent No.: US 6,912,337 B2
(45) Date of Patent: Jun. 28, 2005

(54) NETWORK HEALING SMART FIBER OPTIC SWITCH

(75) Inventors: John Carberry, Talbot, TN (US); Michael L. Smith, Jefferson City, TN (US); Richard Racinskas, Coppell, TX (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 261 days.

(21) Appl. No.: 10/083,095

(22) Filed: Feb. 26, 2002

(65) Prior Publication Data

US 2002/0172453 A1 Nov. 21, 2002

Related U.S. Application Data

(63) Continuation-in-part of application No. 09/649,455, filed on Aug. 25, 2000, now Pat. No. 6,430,335.

(51) Int. Cl.[7] .............................. G02B 6/26; G02B 6/42
(52) U.S. Cl. ............................ 385/20; 385/21; 385/16
(58) Field of Search .............................. 385/16, 20–24; 359/139, 140

(56) References Cited

U.S. PATENT DOCUMENTS

| | | | |
|---|---|---|---|
| 5,028,824 A | * | 7/1991 | Young ........................ 327/262 |
| 5,060,305 A | * | 10/1991 | Prucnal et al. ................. 398/53 |
| 5,710,846 A | * | 1/1998 | Wayman et al. .............. 385/17 |
| 5,726,788 A | | 3/1998 | Fee et al. |
| 6,118,564 A | | 9/2000 | Ooi et al. |
| 6,243,511 B1 | * | 6/2001 | Laughlin ...................... 385/18 |

* cited by examiner

Primary Examiner—Mark A. Robinson
Assistant Examiner—Alessandro Amari
(74) Attorney, Agent, or Firm—Pitts & Brittain, P.C.

(57) ABSTRACT

A network healing smart fiber optic switch for fast, automatic switching between multiple paths of an optical transmission line with minimal disruption. The network healing smart fiber optic switch feeds each of multiple fiber optic inputs to a splitter. One of the outputs of the splitters go to an optical switch, which selects the optical signal to send to the output based on a control signal from a controller or analog selection circuit. The other outputs of the splitters go to the analog selection circuit, which outputs a control signal to the optical switch. The analog selection circuit compares the primary optical signal to a selected setpoint to determine the signal's validity. The analog selection circuit routes an alternate, or secondary, optical signal upon failure of the primary optical signal. After the primary signal is restored and valid for a specified period, the analog selection circuit deselects the secondary optical signal and routes the primary optical signal.

12 Claims, 6 Drawing Sheets

NETWORK HEALING SMART FIBER OPTIC SWITCH

CROSS-REFERENCE TO RELATED APPLICATIONS

This application is a Continuation-In-Part of Ser. No. 09/649,455, filed on Aug. 25, 2000 Pat. No. 6,430,335.

STATEMENT REGARDING FEDERALLY SPONSORED RESEARCH OR DEVELOPMENT

Not Applicable

BACKGROUND OF THE INVENTION

1. Field of Invention

This invention pertains to optical fiber switches for switching optical transmission paths. More particularly, this invention pertains to a fiber optic switch which can switch between incoming optical transmission paths based upon the quality or condition of the signal being transmitted.

2. Description of the Related Art

Optical fibers are commonly used for the transmission of all types of data, including telecommunications, video, and computer data. Fiber optic cables have become an alternative to conventional wire transmission. The advantages of fiber optic cables over wire include greater bandwidth over greater distances with less loss and less cost. Fiber optic cables are considerably less susceptible than metal conductors to unauthorized "taps" and eliminate RF problems and the need for electrical isolation interfaces such as isolators. Because of these advantages, fiber optic cables often are used as an alternative to wire in networks.

Typically, fiber optic cables are used to form a transmission line from an origination point to a destination point. Because of the great bandwidth of optical fiber, many times the fiber optic cable transmits in both directions, so that the origination point for one direction is also the destination point. Depending upon the length of the transmission line, lengths of fiber optic cable may have to be spliced, and the optical signal may have to be amplified in order to maintain the signal strength at the destination point. Along the transmission line, taps and routers may be used so that either portions of or all of the optical signal can be delivered to multiple destinations. Because of their widespread use, fiber optic networks oftentimes have complex topologies and numerous components, and accordingly, are subject to various faults. These faults may develop over a period of time and be evidenced by a slow degradation of signal quality and strength, as in dirt and grime accumulating at connection points and obstructing the cable's optical interface. Other faults may be catastrophic and occur suddenly, as in a cable being cut by an outside force or by failure of an upstream device.

U.S. Pat. No. 5,710,846, titled "Self-calibrating optical fiber switch," issued to Wayman, et al., on Jan. 20, 1998, discloses a microprocessor controlled optical routing switch that samples the input signals and compares them to a reference calibration value. The switch disclosed in Wayman, et al., switches out an input when the sampled signal quality for that input degrades by an amount greater than a preset threshold value.

U.S. Pat. No. 5,726,788, titled "Dynamically Reconfigurable Optical Interface Device Using an Optically Switched Backplane," issued to Fee, et al., on Mar. 10, 1998, discloses optical switches used in a dynamically reconfigurable optical telecommunications network. The switches disclosed in Fee, et al., are used for routing optical signals and are controlled by a microprocessor.

There is a need to provide fast, intelligent fault recovery when a fiber optic cable no longer carries a signal. Fault recovery needs to occur with little delay because with a great bandwidth, long out-of-service times result in the loss of a great amount of data and information.

BRIEF SUMMARY OF THE INVENTION

According to an embodiment of the present invention, a network healing smart fiber optic switch assembly is disclosed comprising an optical switch responding to a controller which monitors multiple paths of an optical transmission line. Each fiber optic input is split into two signal paths, one containing a majority of the signal strength feeding the optical switch and the other feeding the controller, which, using an analog circuit, senses the quality or condition of each fiber optic input. A fault on the primary fiber optic cable causes the network healing smart fiber optic switch to switch to a secondary fiber optic cable within a selected amount of time and preferably within 10 milliseconds. After the fault is corrected and the signal on the primary fiber optic cable is stable for a period, the switch restores the primary fiber optic cable path. Faults on a fiber optic cable are defined as a degradation of signal strength below a threshold, or setpoint, level or the complete loss of the optical signal. Other embodiments define faults as a change in color or frequency of the optical signal. The network healing smart fiber optic switch is also controlled locally and remotely via a buss connection with another computer or controller.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
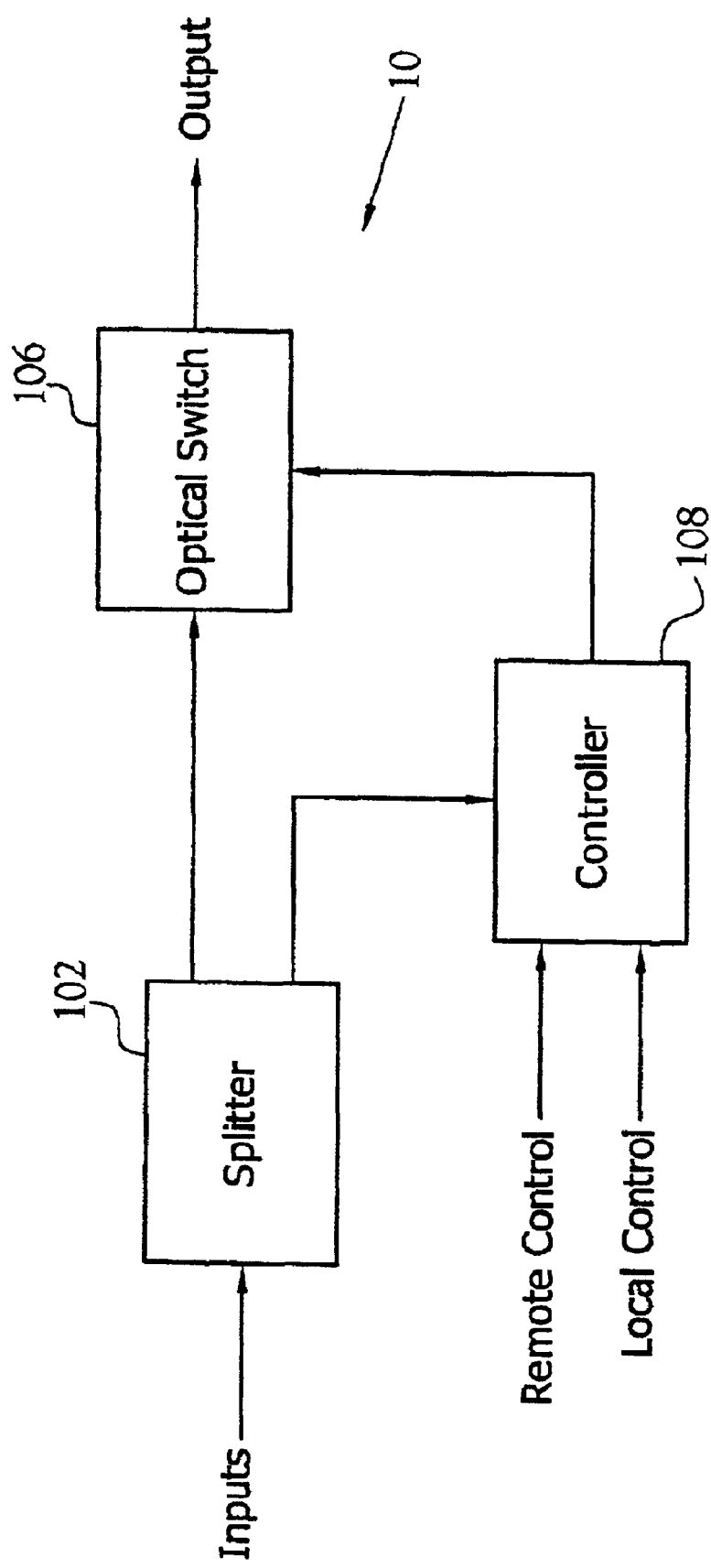
FIG. 1 illustrates a flow diagram of the network healing smart fiber optic switch.

Referring to FIG. 1, a flow diagram of the network healing smart fiber optic switch 10 has a plurality of inputs feeding a splitter 102. Each input is split into two signals, one going to the optical switch 106 and the other going to the controller 108. The controller 108 senses the condition of the signals from the splitter, and based on the sensed condition, which can be optionally overridden by either local or remote control, the controller 108 sends a control signal to the optical switch 106. The optical switch 106 switches, or routes, the signals from the splitter to the output, based on the control signal from the controller 108.

Figure 2:
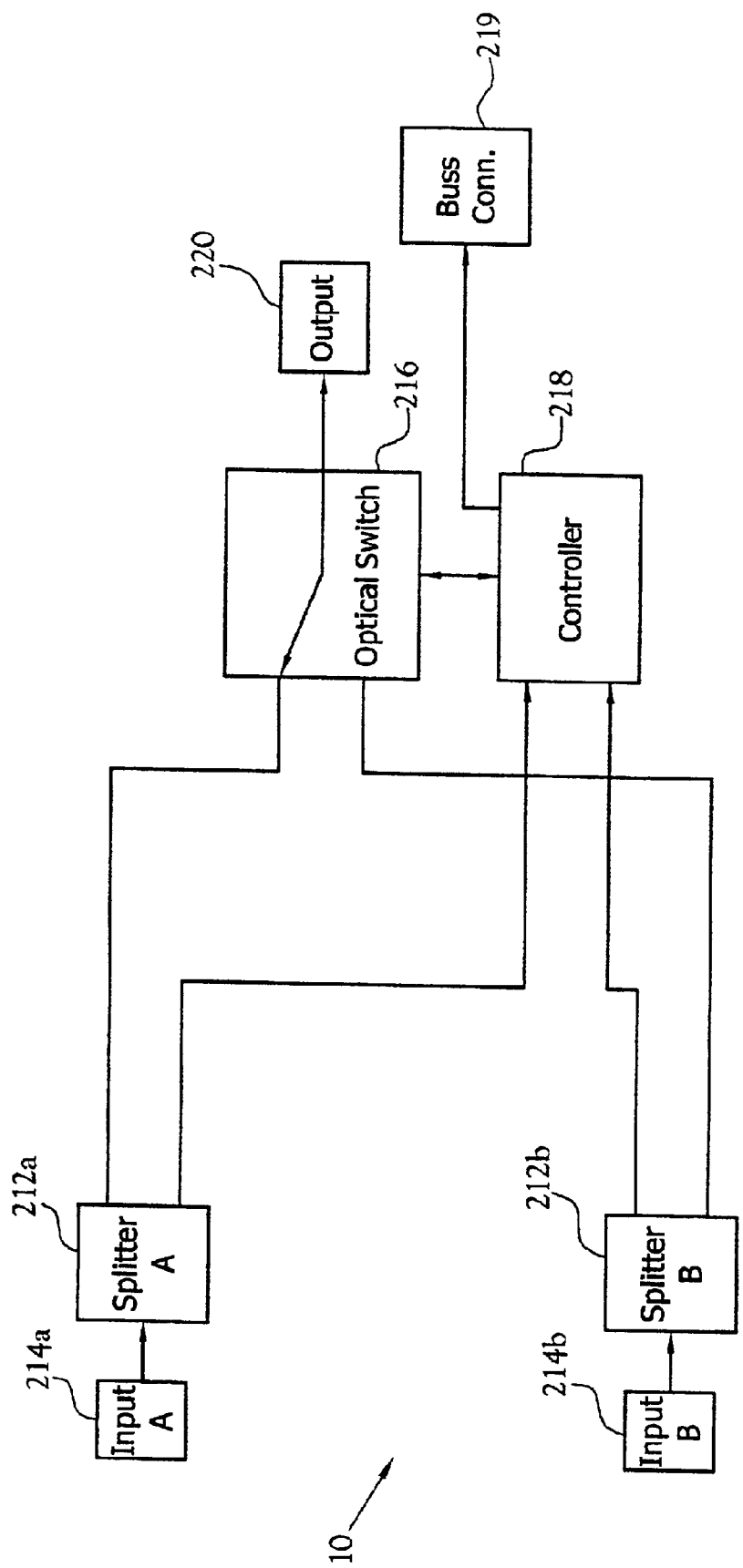
FIG. 2 illustrates a block diagram of the preferred embodiment of the network healing smart fiber optic switch.

In FIG. 2, the network healing smart fiber optic switch 10 has two fiber optic inputs representing two paths of an optical transmission line, one of which is passed through to the output. A fiber optic cable is connected to input A 214a. The optical signal from input A 214a is divided into two paths by splitter A 212a. The primary path, which consists of approximately 95% of the optical signal strength, goes to the optical switch 216. The secondary path, corresponding to approximately 5% of the optical signal strength, goes to the controller 218. Those skilled in the art will recognize that the division of the signal between the primary and secondary paths is not critical, and that if less than 95% signal strength is used for the primary path because the controller 218 sensing means requires more than 5% of the signal strength, the primary path signal strength can be increased by amplification at any point in its path. A second fiber optic cable is connected to input B 214b and is processed in a manner similar to the first fiber optic cable.

The optical switch 216 accepts inputs from splitter A 212a and splitter B 212b. The optical switch 216 is responsive to a control signal from the controller 218. The control signal causes the optical switch 216 to select and pass through to the output 220 one of the two inputs from splitter A 212a or splitter B 212b. The optical switch 216 is capable of switching between inputs within a short period.

The controller 218 is an analog selection circuit that senses the optical signals from splitter A 212a and splitter B 212b and has logic which determines which optical signal has the greatest optical signal strength. The controller 218 is responsive to local control which serves to override the controller 218 output. Also, the controller 218 is responsive to a buss connection 219, which puts the controller 218 into communication with a remote computer or other device and serves to provide control instructions to the controller 218. The controller 218 outputs a control signal to the optical switch 216 which causes the optical switch 216 to select and pass through to the output 220 one of the two inputs from splitter A 212a or splitter B 212b.

In the illustrated embodiment, the controller 218 includes a photodiode, which senses the signal level from each fiber optic cable input. The controller 218 also includes logic which determines if the fiber optic signal passing through to the output has an optical signal strength, as sensed by the photodiode, which has fallen below a specified threshold value. If it has, the controller 218 causes the optical switch 216 to switch to the signal from another fiber optic cable. The optical switch 216 completes the switchover within a specified period, preferably within 10 milliseconds or less, effectively bypassing the fault, whether caused by a gradual signal degradation or equipment failure, with minimal disruption to the transmitted signal. After causing the optical switch 216 to operate, the controller 218 will inhibit further switching action for a specified period, effectively preventing rapid oscillation between the input signals. Those skilled in the art will recognize that means for sensing the optical inputs and parameters other than signal strength may be used without departing from the spirit or scope of the present invention. An alternative embodiment of the controller 218 includes logic which compares the primary fiber optic cable's optical signal strength to that of the other fiber optic cable's optical signal strength, and causes the optical switch 216 to switch to the fiber optic cable which has the greater signal strength.

Figure 3:
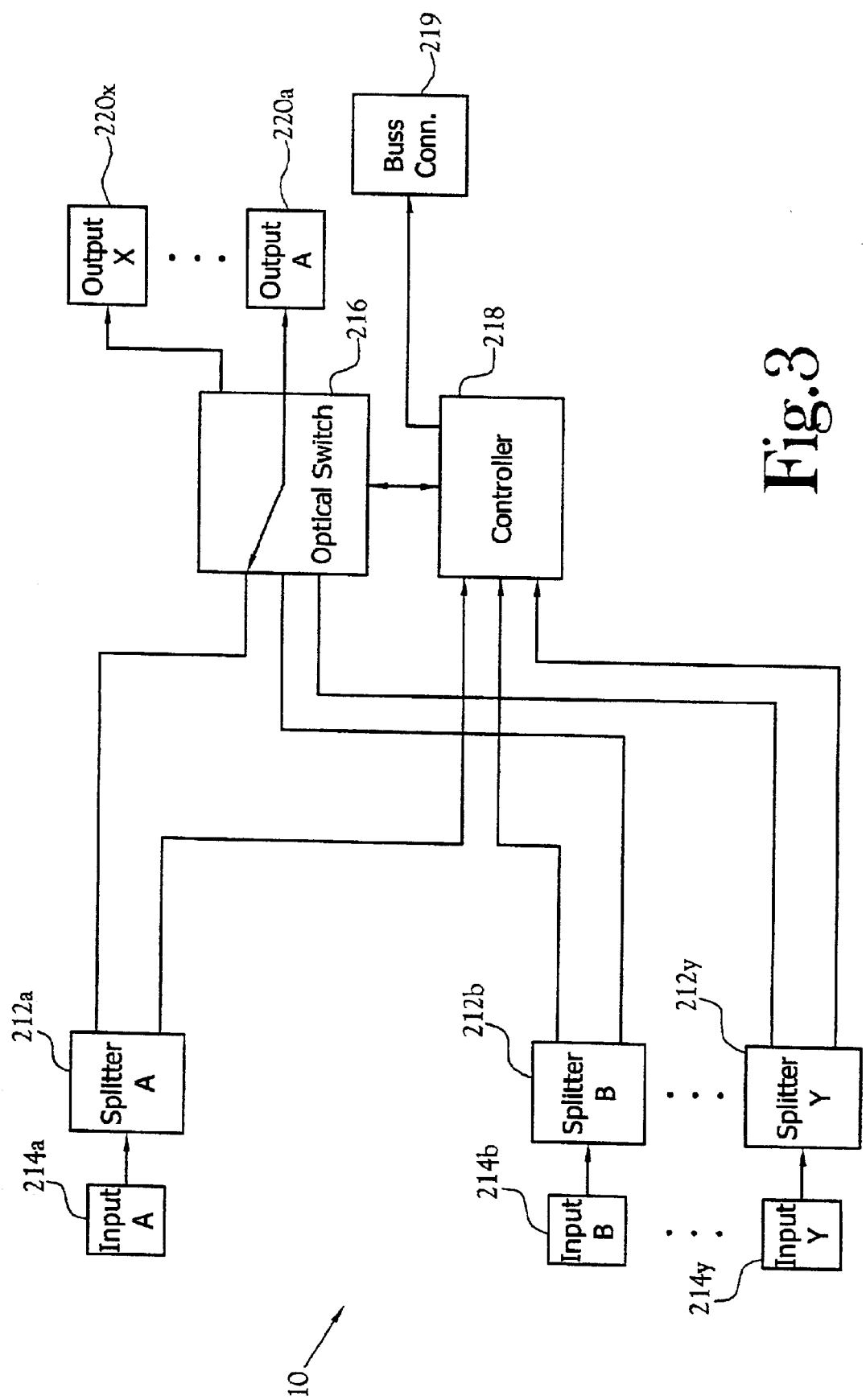
FIG. 3 illustrates a block diagram of the network healing smart fiber optic switch with multiple inputs and multiple outputs.

Referring to FIG. 3, another embodiment of the network healing smart fiber optic switch 10 is shown as having multiple inputs (214a through 214y) and multiple outputs (220a through 220x). The controller 218 causes the optical switch 216 to switch any input to any output, based on the logic of the controller 218, the sensed condition of the inputs, and any overriding signal from a local controller or remote source communicating through the buss connection 219. As in the preferred embodiment described above, the condition sensed is a fault condition as determined by the signal strength of an input degrading below a threshold value. An alternative embodiment of the controller 218 permits communication with other network healing smart fiber optic switches 10 or computer systems such that, working in conjunction with other network healing smart fiber optic switches 10 or other devices, network paths may be rerouted to bypass fault conditions and accommodate network loading.

Those skilled in the art will recognize that there are additional alternative embodiments for the network healing smart fiber optic switch 10. For example, in one embodiment, the controller 218 causes the optical switch 216 to switch based on the presence or absence of a particular color or wavelength in the optical signal. In another embodiment, the optical switch 216, in conjunction with other optical switches, is capable of combining the optical signals from two or more input signals to produce a single, composite output signal with the combination occurring based on the condition of the optical signals.

Figure 4:
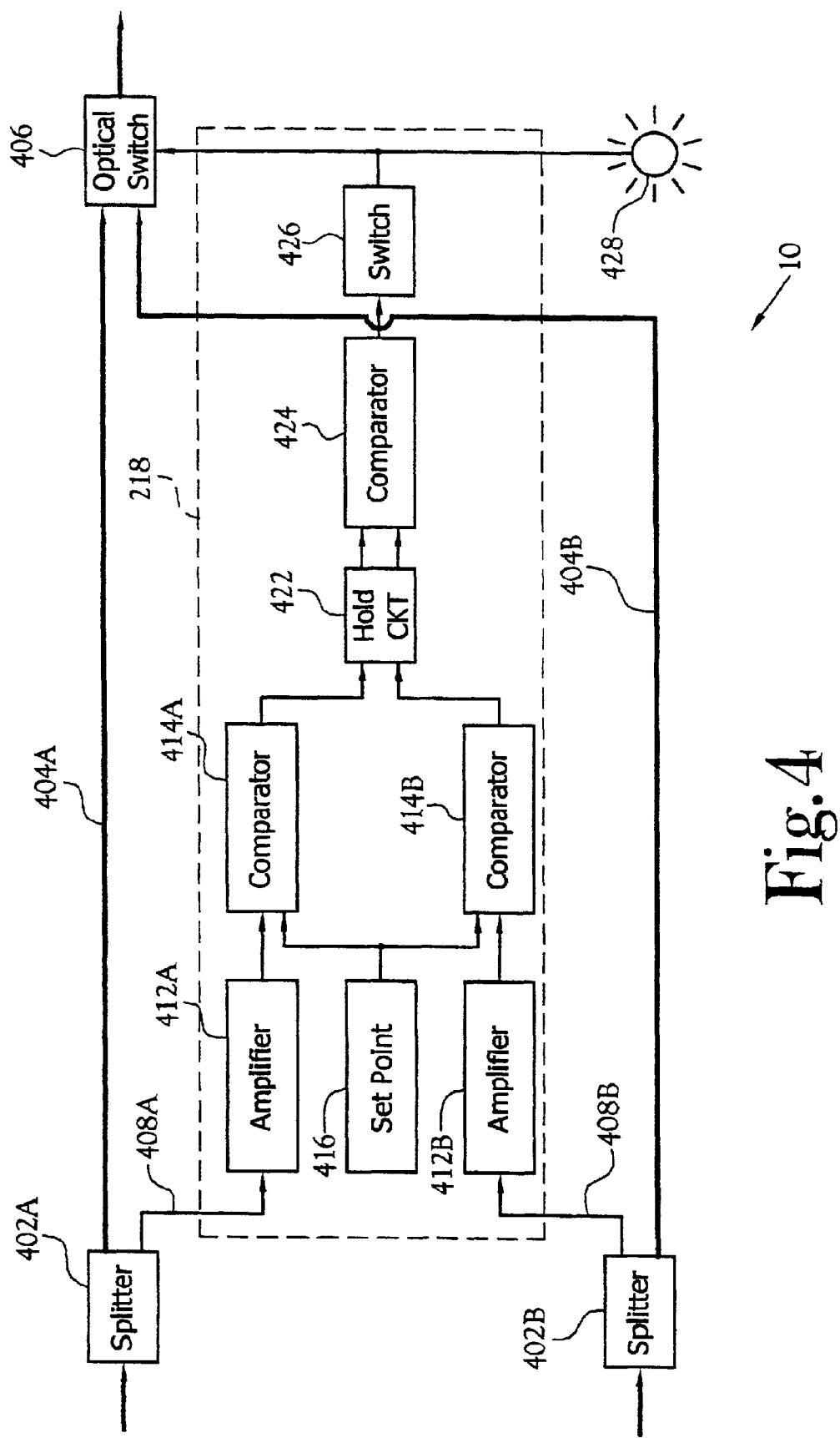
FIG. 4 illustrates a block diagram of the circuit elements of the network healing smart fiber optic switch.

FIG. 4 illustrates a block diagram of one embodiment of the circuit elements of the network healing smart fiber optic switch 10. The two splitters 402A and 402B each receive an external optical signal. Each splitter 402A and 402B outputs an optical signal 404A and 404B, which is routed directly to the optical switch 406. Each splitter 402A and 402B also outputs a portion of the input as an electrical signal 408A and 408B, which is routed to the analog selection circuit, or controller, 218.

One optical signal 404A is considered the primary optical signal and the other optical signal 404B is considered the secondary optical signal. The conversion of the split optical signal to an electrical signal 408A and 408B, which is typically done with an photodiode, is included in the function of either the splitter 402 or the amplifier 412. The amplifiers 412A and 412B receive signals 408A and 408B from the splitters 402A and 402B and output signals to input signal comparators 414A and 414B, which compare the amplifier 412A and 412B output signals to a setpoint value 416. The two comparators 414A and 414B output to a holding circuit 422 which outputs signals to an output comparator 424, which outputs to a switch 426 that controls an indicator 428 and the optical switch 406. The output of the A comparator 414A indicates that the primary optical signal 404A is valid, or a good signal, when the signal 408A exceeds the setpoint 416, and indicates that the primary optical signal 404A is invalid, or not a good signal, when the signal 408A does not exceed the setpoint 416. The output of the B comparator 414B indicates that the secondary optical signal 404B is valid, or a good signal, when the signal 408B exceeds the setpoint 416.

Figure 5:
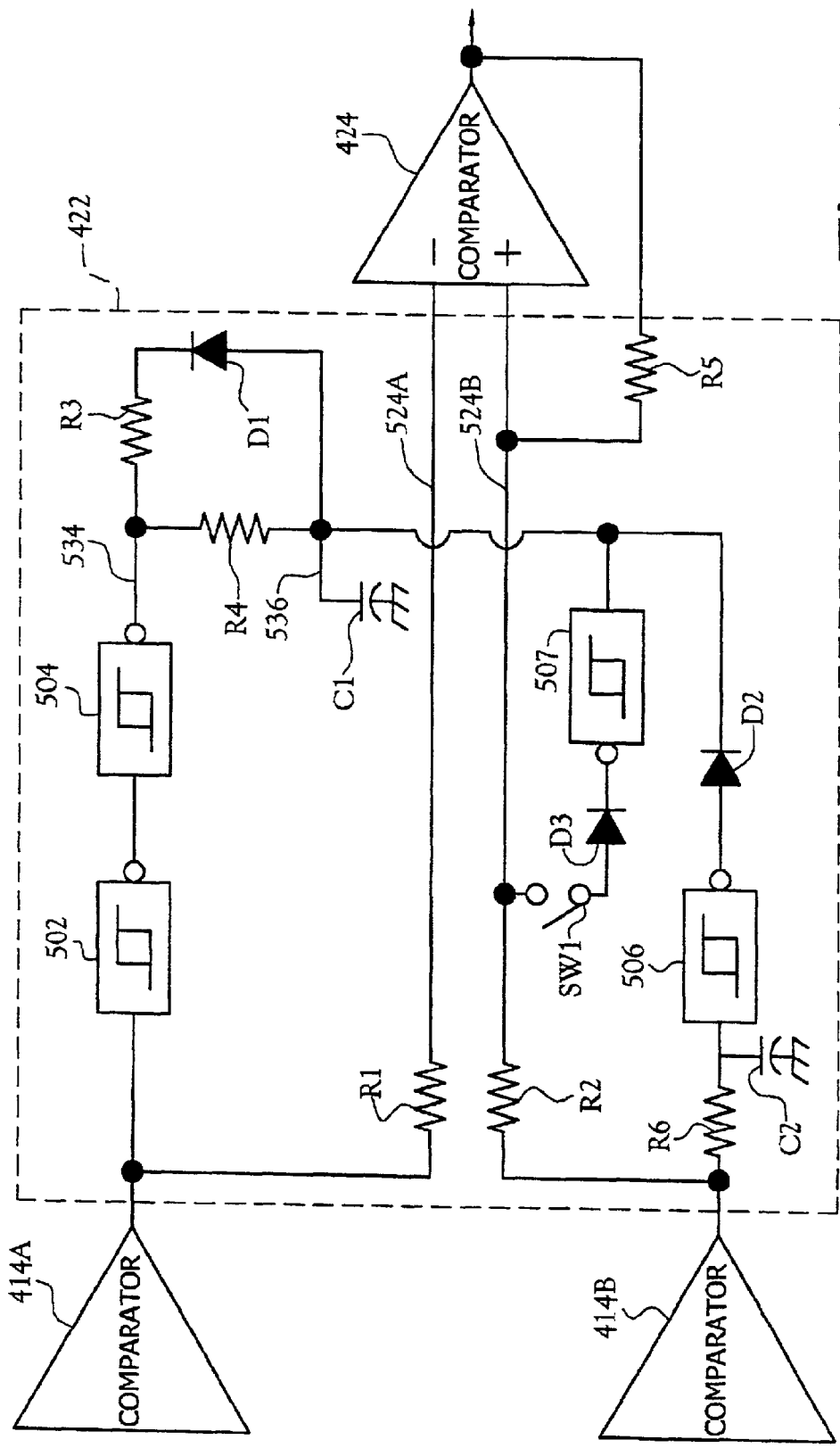
FIG. 5 illustrates a simplified schematic diagram of a portion of the network healing smart fiber switch.

FIG. 5 illustrates a simplified schematic diagram of one embodiment of the holding circuit 422. The function of the holding circuit 422 is determined by the position of a manual mode switch SW1. With the switch SW1 open, the holding circuit 422 causes the optical switch 406 to switch to the B input 408B upon failure of the A input 408A and to maintain that path until failure of the B input 408B, at which time the holding circuit 422 resets to the default of passing the A input 408A. The positive feedback/pull-up resistor R5 maintains the B input 408B high after the B input 408B is selected.

With the switch SW1 closed, the holding circuit 422 causes the optical switch 406 to switch to the B input 408B upon failure of the A input 408A and to maintain that path until the A input 408A has been restored and been stable for a time determined by the RC network C1 and R4. After the A input 408A has remained stable and charged the capacitor C1, the input of the Schmitt trigger 507 increases to its threshold value and the output of the trigger 507 goes low, causing a current flow through the switch SW1 and the diode D3 and forcing the B input 524B to a voltage less than the voltage of the A input 524A to the output comparator 424, which is equal to the output voltage of the A comparator 414A.

An analog selection circuit 218, such as that shown in FIG. 4, has the speed to quickly switch out a failing optical signal, that is, an optical signal that has a level that falls below the setpoint 416. In one embodiment, illustrated in FIG. 5, Maxim MAX908 comparators, Maxim MAX494 op-amps, and Fairchild MM74HC 14 Schmitt triggers are used, and the circuit has a switching time of less than 10 milliseconds. In another embodiment, the signal to the indicating lamp 428 is also output to a computer system or other controller for status monitoring by the remote system.

Figure 6:
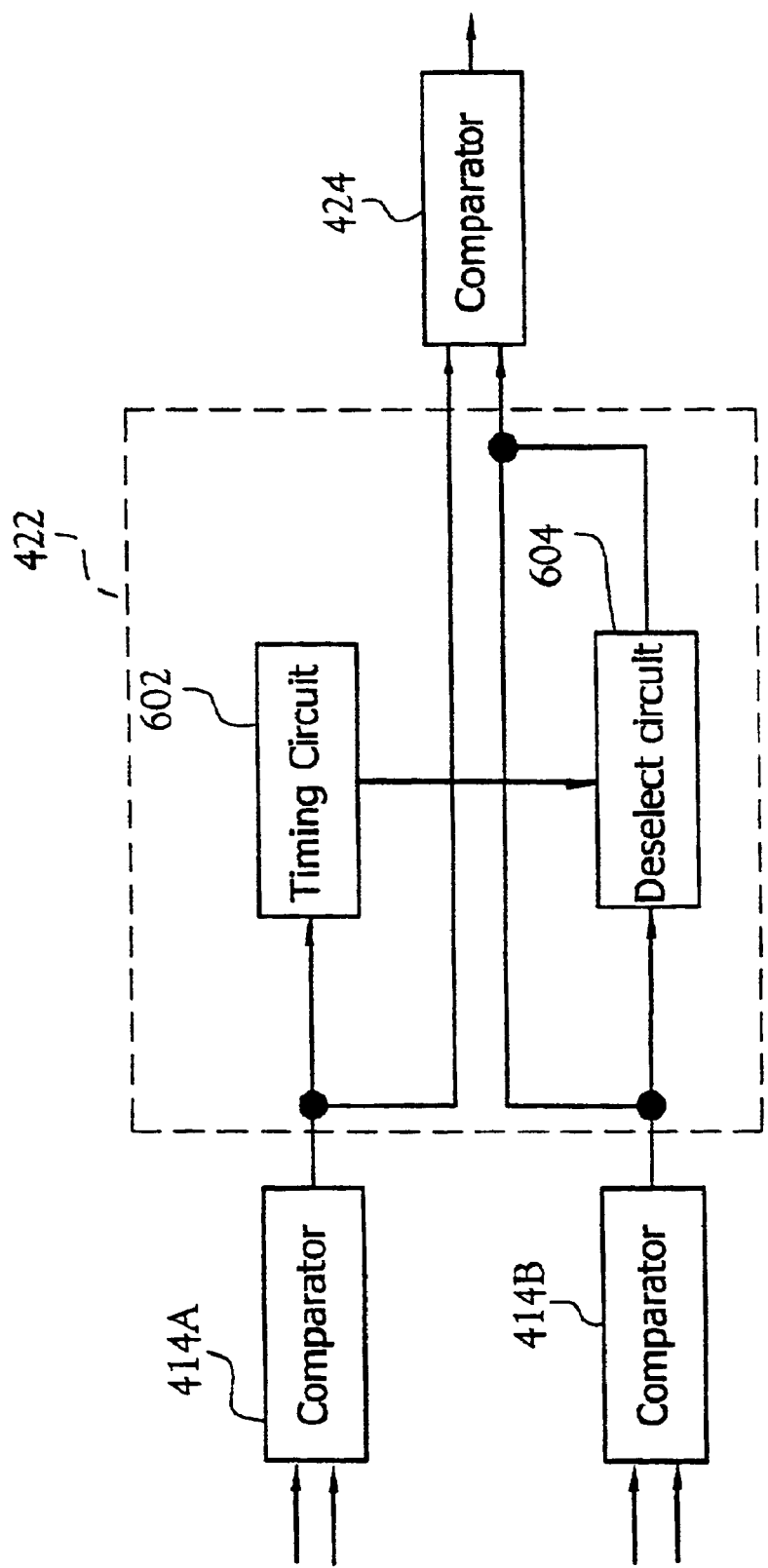
FIG. 6 illustrates a block diagram of a portion of the analog selection circuit.

FIG. 6 illustrates a block diagram of a portion of the analog selection circuit 218, including the holding circuit 422. The setpoint comparators 414A and 414B output to a comparator 424, which routes the secondary optical signal 404B upon the primary optical signal 404A becoming invalid. This arrangement ensures that the primary optical signal 404A is routed under normal conditions. The A setpoint comparator 414A outputs to a timing circuit 602, which starts a timing cycle when a failed or faulted primary signal 408A is restored or again becomes valid. The timing circuit 602 resets when the A comparator 414A senses that the signal 408A is below the setpoint and invalid, i.e. failed or faulted. The timing circuit 602 outputs a signal to the deselect circuit 604 after a selected time passes in which the restored primary signal 408A has been valid and stable. The deselect circuit 604 has an input from the B setpoint comparator 414B and outputs to the output comparator 424. In the embodiments illustrated in FIGS. 5 and 6, the B input to the output comparator 424 is held high after the secondary optical signal 404B is selected, and the deselect circuit 604 pulls that input down to select the primary optical signal 404A after the primary optical signal 404A has been valid for a selected period.

From the forgoing description, it will be recognized by those skilled in the art that a network healing smart fiber optic switch 10 offering advantages over the prior art which has been provided. Specifically, the network healing smart fiber optic switch 10 is a fast, automatic switch that permits switching between multiple paths of an optical transmission line with minimal disruption. Also, the network healing smart fiber optic switch 10 is capable of communicating with other computers and controllers, permitting the network healing smart fiber optic switch 10 to be remotely controlled.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for switching a plurality of optical paths, each carrying an optical signal, said apparatus comprising:
   a first splitter having an input being a primary optical signal;
   a second splitter having an input being a secondary optical signal;
   an analog selection circuit having a first input from said first splitter and a second input from said second splitter; wherein said analog selection circuit includes a timing circuit responsive to said primary optical signal; and a deselect circuit responsive to said timing circuit, and
   an optical switch having a first switch input from said first splitter and a second switch input from said second splitter, said switch responsive to said analog selection circuit.

2. The apparatus of claim 1 wherein
   said timing circuit outputs a timing signal to said deselect circuit after a selected period in which a valid primary optical signal is present,
   said deselect circuit causes said optical switch to route said primary optical signal to an output of said optical switch upon receiving said timing signal.

3. The apparatus of claim 1 wherein said timing circuit includes
   a network including a resistor and a capacitor having a charging time defining a selected period before said primary optical signal is routed through said optical switch.

4. The apparatus of claim 1 wherein said deselect circuit includes
   a network including a Schmitt trigger and a diode, said network causing said optical switch to route said primary optical signal upon actuation of said network by a timing signal from said timing circuit.

5. An apparatus for switching a plurality of optical paths, each carrying an optical signal, said apparatus comprising:
   a first splitter having an input being a primary optical signal;
   a second splitter having an input being a secondary optical signal;
   an analog selection circuit having a first input from said first splitter and a second input from said second splitter; wherein said analog selection circuit includes a means for routing said secondary optical signal after said primary optical signal becomes invalid; a means for determining whether said primary optical signal has been valid for a selected period; and a means for deselecting said secondary optical signal and routing said primary optical signal through said optical switch, and
   an optical switch having a first switch input from said first splitter and a second switch input from said second splitter, said switch responsive to said analog selection circuit.

6. An apparatus for switching a plurality of optical paths, said apparatus comprising:
   a first splitter having an input being a primary optical signal and having a pair of outputs including a first splitter main output and a first splitter second output;
   a second splitter having an input being a secondary optical signal and having a pair of outputs including a second splitter main output and a second splitter second output;

an analog selection circuit receiving inputs from said first splitter second output and said second splitter second output, said analog selection circuit including a timing circuit responsive to said first splitter second output, said timing circuit including a resistor and a capacitor having a charging time defining a selected period, and a deselect circuit responsive to said timing circuit, said timing circuit outputting a timing signal to said deselect circuit after said selected period in which a signal indicating that said first splitter second output has a level greater than a selected value; and an optical switch having a first switch input from said first splitter main output and a second switch input from said second splitter main output, said switch responsive to said analog selection circuit, which causes said optical switch to route said first splitter main output to an output of said optical switch upon receiving said timing signal.

7. An apparatus for switching a plurality of optical paths, said apparatus comprising:

a first splitter having an input being a primary optical signal;

a second splitter having an input being a secondary optical signal;

an analog selection circuit having a first input from said first splitter and a second input from said second splitter, said analog selection circuit including a timing circuit responsive to said primary optical signal, and a deselect circuit responsive to said timing signal, said timing circuit initiated by receiving a valid primary optical signal, said timing circuit outputting a timing signal to said deselect circuit after a selected period in which said valid primary optical signal is present; and an optical switch having a first switch input from said first splitter and a second switch input from said second splitter, said switch responsive to said analog selection circuit, which causes said optical switch to route said primary optical signal to an output of said optical switch upon receiving said timing signal.

8. The apparatus of claim 7 wherein said timing circuit includes a network including a resistor and a capacitor, said network defining a period before said primary optical signal is routed through said optical switch.

9. The apparatus of claim 7 wherein said analog selection circuit is responsive to an optical signal strength of said primary optical signal and is responsive to an optical signal strength of said secondary optical signal.

10. The apparatus of claim 7 wherein said timing circuit includes a network including a resistor and a capacitor having a charging time defining a selected period before said primary optical signal is routed through said optical switch.

11. The apparatus of claim 7 wherein said deselect circuit includes a network including a Schmitt trigger and a diode, said network causing said optical switch to route said primary optical signal upon actuation of said network by a timing signal from said timing circuit.

12. An apparatus for switching a plurality of optical paths, said apparatus comprising:

a means for routing a primary optical signal through an optical switch;

a means for sensing a valid primary optical signal;

a means for routing a secondary optical signal through said optical switch;

a means for determining when said primary optical signal has been valid for a selected period; and a means for deselecting said secondary optical signal and routing said primary optical signal through said optical switch.

* * * * *